United States Patent [19]

Ikeda et al.

[11] 4,315,061
[45] Feb. 9, 1982

[54] BATTERY WITH INTERNAL ELECTRICAL CONNECTORS

[75] Inventors: Hironosuke Ikeda, Hirakata; Satoshi Narukawa; Shigehiro Nakaido, both of Kobe, all of Japan

[73] Assignee: Sanyo Electric Co., Ltd., Moriguchi, Japan

[21] Appl. No.: 158,781

[22] Filed: Jun. 12, 1980

[30] Foreign Application Priority Data

Jun. 25, 1979 [JP] Japan .............................. 54-87181[U]
Nov. 2, 1979 [JP] Japan ........................... 54-152639[U]
Jan. 17, 1980 [JP] Japan ............................... 55-4138[U]
May 9, 1980 [JP] Japan ............................. 55-64137[U]

[51] Int. Cl.³ .............................................. H01M 2/26
[52] U.S. Cl. .................................................. 429/161
[58] Field of Search ......................................... 429/161

[56] References Cited

U.S. PATENT DOCUMENTS 4,226,925 10/1980 Ikeda et al. ......................... 429/161

Primary Examiner—Donald L. Walton
Attorney, Agent, or Firm—Darby & Darby

[57] ABSTRACT

A battery with improved performance has a collector mechanism which facilitates assembly. The battery has a first centrally located electrode plate, which has a first polarity. Second and third electrode plates having a second polarity are located above and below the first electrode plate, respectively, and are separated therefrom by separator layers. A first outer case forms a terminal of the first polarity and is insulated from the second electrode plate by a first insulating plate. A second outer case is electrically connected to the second and third electrode plates. The first outer case is electrically connected to the first electrode plate by a collector rod which passes through one of the separator layers, the second electrode plate, and the first insulating plate.

16 Claims, 9 Drawing Figures

BATTERY WITH INTERNAL ELECTRICAL CONNECTORS

FIELD OF THE INVENTION

The present invention relates to a flat battery in which a first electrode plate having a first polarity is sandwiched by second and third electrode plates having a second polarity with first and second separator layers respectively diposed therebetween, and in which these electrode plates are housed in a first outer case forming a terminal of the first polarity and a second outer case forming a terminal of the second polarity.

BACKGROUND OF THE INVENTION

In a conventional flat battery of this type, the end of a conductive piece extending from the lateral side of the first electrode plate (located at the center of the battery) is inserted into a notch formed in an insulating plate located beneath the inner surface of the first outer case and is pressed against or welded to the first outer case, thereby being connected thereto. Thus, in such a conventional flat battery, the collector mechanism connecting the first electrode plate to the first outer case is complicated, and a short-circuit might arise in the battery if the insulating plate is shifted.

DISCLOSURE OF THE INVENTION

The objects of the invention are to improve the collector mechanism of the prior art to facilitate battery assembly, and to improve the utilization coefficient of the first electrode plate.

The present invention provides a battery characterized in that a first centrally located electrode plate having a first polarity is sandwiched between second and third electrode plates having a second polarity with first and second separator layers respectively disposed therebetween, in that a first insulating plate is disposed beneath a first inner surface of a first outer case forming a terminal of the first polarity, central bores are formed in the first insulating plate, the second electrode plate and the first separator layer, in that a collector rod passes through these central bores, in that an insulating cylinder surrounds the outer periphery of the collector rod, in that the collector rod is electrically connected at a first end thereof to the first inner surface of the first outer case and at the second end thereof to the first plate, in that the third electrode plate is electrically connected to the second electrode plate and to a second inner surface of a second outer case forming a terminal of the second polarity, and in that the second outer case is joined to the first outer case through insulating packing.

BRIEF DESCRIPTION OF THE DRAWINGS

The invention will be further described by way of example with reference to the accompanying drawings, in which.

DETAILED DESCRIPTION OF PREFERRED EMBODIMENTS

Figure 1:
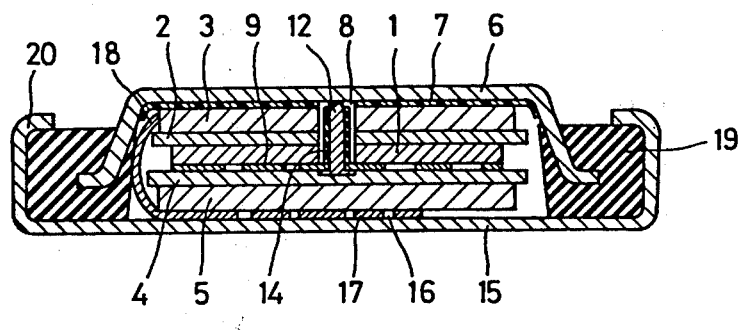
FIG. 1 is a sectional view of a first embodiment of a battery in accordance with the present invention.

Corresponding elements in FIGS. 1 to 9 are designated by like reference numerals.

Referring first to FIG. 1, a first electrode plate 1 having a first polarity (and constituting a negative electrode of the battery) is a rolled plate using lithium as an active material and is located at the center of the battery.

A second electrode plate 3 having a second polarity is disposed above the first electrode plate 1 and is separated therefrom by a first separator layer 2 disposed between the first and second electrode plates 1 and 3. A third electrode plate 5 having the second is disposed beneath the first electrode plate 1 and is separated therefrom by a second separator layer 4 disposed between the first and third electrode plates 1 and 5. The second and third electrode plates 3 and 5 constitute the positive electrode plates of the battery and contains manganese dioxide as an active material.

A first insulating plate 7 is disposed beneath the first inner surface of a first outer case 6 having the first polarity. First outer case 6 forms a negative terminal. Central bores are formed in the first insulating plate 7, the second electrode plate 3, the first separator layer 2 and the first electrode plate 1, and these central bores form a bore portion 8.

Figure 2:
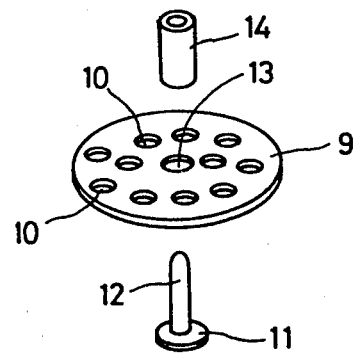
FIG. 2 is a disassembled perspective view of portions of the battery shown in FIG. 1.

As shown in FIG. 2, a plurality of bores 10 are formed in a collector plate 9. A collector rod 12 having a flange 11 at the lower end thereof (which end is hereinafter denominated a second end) is inserted into a central bore 13 formed in the collector plate 9, so that the collector rod 12 is attached to the collector plate 9 in a unitary construction. An insulating cylinder 14 for preventing short-circuits surrounds the outer periphery of the collector rod 12. The collector plate 9 is disposed beneath the first electrode plate 1 to come in contact therewith, and the collector rod 12 is inserted into the bore portion 8. The upper end of collector rod 12 (which is hereinafter denominated a first end) touches the first inner surface of the first outer case 6 and is therefore electrically connected thereto. The second end of the collector rod 12 is electrically connected to the first electrode plate 1 through the collector plate 9. Thus, the collector plate 9 is located between the first electrode plate 1 and the second separator layer 4.

A collector plate 17 having therein a plurality of bores 16 is disposed on a second inner surface of a second outer case 15 which forms a positive terminal. The upper surface of the collector plate 17 comes in contact with the third electrode plate 5. A collector piece 18 extends laterally from the side of the second electrode plate 3. The end of the collector piece 18 is held by and between the lower surface of the third electrode plate 5 and the second inner surface of the second outer case 15. Thus, the second and third electrode plates 3 and 5 are electrically connected to the second outer case 15.

The periphery of the first outer case 6 is joined to insulating packing 19 using the insert forming method. The peripheral curved edge 20 of the second outer case 15 is caulked onto the upper surface of the insulating packing 19. Thus, the first outer case 6 is joined to the second outer case 15 through the insulating packing 19.

In this first embodiment, the second and third electrode plates 3 and 5 are disposed above and beneath the first electrode plate 1. Therefore, as compared with a conventional battery (in which a first electrode plate having a first polarity and a second electrode plate having a second polarity are alternately superposed) the reaction area of the first electrode plate having one polarity is increased in the present invention, to thereby enhance the utilization coefficient of the electrode, and improve battery performance.

In a manganese dioxide-lithium type battery in which the negative electrode plate contains metallic lithium as an active material and in which the positive electrode plate contains manganese dioxide as an active material, lithium in the negative electrode plate is diffused into a crystal of manganese dioxide within the positive electrode plate in the discharge reaction. Therefore, as discharge continues the thickness of each of the positive electrode plates is apt to increase. When this thickening takes place, diffusion resistance is also increased, so that the utilization coefficient of the electrode plate is lowered.

On the contrary, when two positive electrode plates are used as in the present invention, and if the thicknesses of such positive electrode plates is reduced by half, increased diffusion resistance may be restrained. Therefore, battery discharge characteristics may be improved, improving performance.

The collector mechanism for holding the first electrode plate 1 between the second and third electrode plates 3 and 5 will now be described.

The collector rod 12 projecting above the first electrode plate 1 passes through the respective central bores in the first insulating plate 7, the second electrode plate 3 and the first separator 2, and the first end of the collector rod 12 is electrically connected to the first inner surface of the first outer case 6. Therefore, it suffices to merely superpose the respective electrode plates and separator layers successively, to simplify battery assembly.

Figure 3:
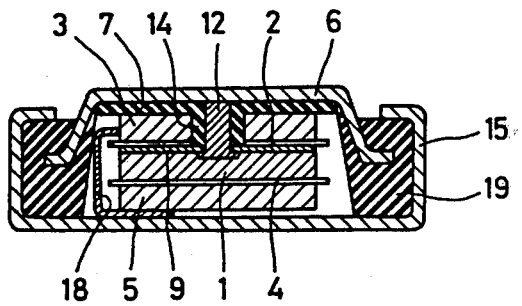
FIG. 3 is a sectional view of a second embodiment of a battery in accordance with the present invention.

A second embodiment of the present invention will be described with reference to FIGS. 3 and 4.

Figure 4:
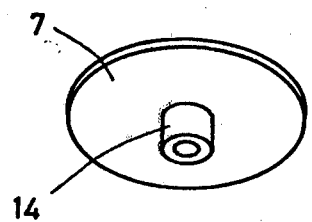
FIG. 4 is a perspective view of portions of the battery in FIG. 3, taken from beneath.

The second embodiment differs from the first embodiment of FIG. 1 in the following respects:

As is apparent from FIG. 4, the first insulating plate 7 disposed beneath the first inner surface of the first outer case 6 is formed integrally with an insulating cylinder 14, which latter surrounds the outer periphery of a collector rod 12. Thus, the insulating cylinder 14 is integrally formed about the circumference of the central bore in the insulating plate 7. The insulating plate 7 is secured to the first inner surface of the first outer case 6 by adhesives or thermal deposition.

A first electrode plate 1 has no central bore and a collector plate 9 is disposed on the first electrode plate 1.

In the second embodiment, since the first insulating plate 7 is securely attached to the first inner surface of the first outer case 6, there is no possibility that the first insulating plate 7 will shift in position.

Furthermore, since the insulating cylinder 14 is formed integrally around the circumference of the central bore in the first insulating plate 7 and passes through the central bore in the second electrode plate 3 and since the collector rod 12 projects from the first electrode plate 1 and is inserted into the insulating cylinders 14, it is possible to prevent the collector rod 12 from coming in contact with the second electrode plate 3, to thereby prevent the occurrence of an internal short-circuit.

Figure 5:
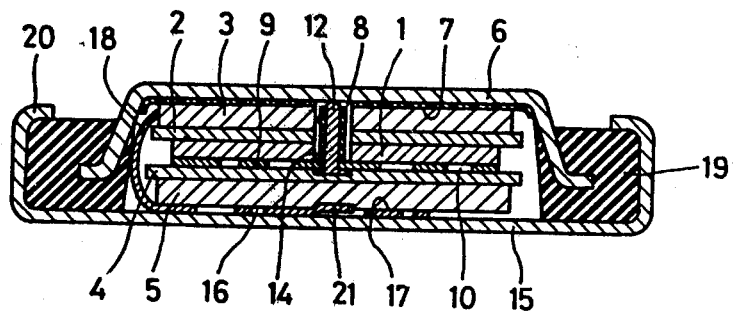
FIG. 5 is a sectional view of a third embodiment of a battery in accordance with the present invention.

The third embodiment of the present invention will be described, with reference to FIGS. 5 and 6.

Figure 6:
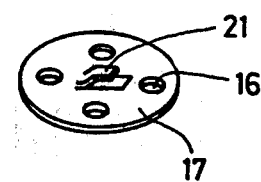
FIG. 6 is a perspective view of portions of the battery shown in FIG. 5.

The third embodiment differs from the first embodiment of FIG. 1 in the following respects:

As shown in FIG. 6, a resilient spring piece 21 is integrally formed with a collector plate 17, which latter is disposed between the second inner surface of the second outer case 15 and the third electrode plate 5. The collector plate 17 has therein a plurality of bores 16. The resilient spring piece 21 is a partially cut away portion of the collector plate 17 and is raised up therefrom. The resilient spring piece 21 urges the third electrode plate 5 upwardly. The collector plate 17 is secured to the second inner surface of the second outer case 15 by spot-welding, or by other means.

In the third embodiment, the collector rod 12 is spring-loaded upwardly by the force of the resilient spring piece 21 of the collector plate 17, through the third electrode plate 5 and the second separator layer 4, so that the first end of the collector rod 12 is pressed against the first inner surface of the first outer case 6 at all times. Thus, the collector rod 12 and the first outer case 6 may be readily and securely electrically connected by merely superposing the electrode plates and separator layers in succession, without the necessity of spot-welding.

The fourth embodiment of the present invention will now be described, with reference to FIGS. 7 and 8.

The fourth embodiment differs from the first embodiment of FIG. 1, in the following respects:

No central bore is formed in the collector plate 9 and the collector rod 12 does not pass through the collector plate 9. After the insulating cylinder 14 is slipped over the collector rod 12, the collector rod 12 is secured at the first end thereof to the first inner surface of the first outer case 6 by spot-welding, as is shown in FIG. 8. An insulating plate 7, the second electrode plate 3 and the first separator 2 each having a central bore are slipped on the collector rod 12 is succession. A first electrode plate 1 secured at its lower surface to the collector plate 9 is then placed so that its central bore receives collector rod 12. The collector plate 9 is pressed against the lower end of the collector rod 12. With welding electrodes applied to the first outer case 6 and the collector plate 9, the second end of the collector rod 12 is securely spot-welded to the collector plate 9.

Since the collector rod 12 in the fourth embodiment is secured to the first inner surface of the first outer case 6 in advance, this collector rod 12 may be utilized as a jig means for inserting the first insulating plate 7, the second electrode plate 3 and the first separator layer 2, respectively, whereby the battery may be very easily assembled.

Moreover, since the collector rod 12 is secured at its second end to the collector plate 9 by spot-welding, the first insulating plate 7, the second electrode plate 3, the first separator layer 2, the first electrode plate 1 and the collector plate 9 are all formed into a unitary construction in the first outer case 6, so that a unified structure may be provided, and battery assembly may further be facilitated.

Furthermore, the electrical connection between the collector plate 9 and the collector rod 12 may be made more secure, thereby to improve the collector effectiveness.

It is not required that the collector plate 9 and the collector rod 12 be secured to each other, but it suffices if they are merely pressed against each other.

Figure 9:
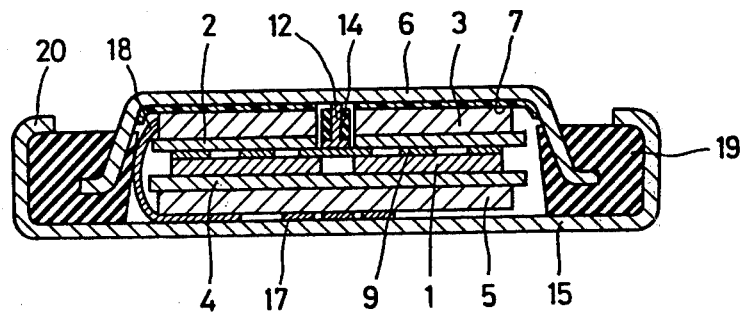
FIG. 9 is a sectional view of a fifth embodiment of battery in accordance with the present invention.

A fifth embodiment of the present invention will now be described, with reference to FIG. 9.

The fifth embodiment differs from the fourth embodiment of FIG. 7 in the following respects:

A collector rod 12 is not inserted into the central bore of the first electrode plate 1. The collector plate 9 secured to the upper surface of the first electrode plate 1 contacts the lower surface of a first separator layer 2. With one welding electrode applied to the first outer case 6 and another welding electrode applied to the collector plate 9 through the central bore in the first electrode plate 1, the collector rod 12 is securely spot-welded to the collector plate 9.

Figure 7:
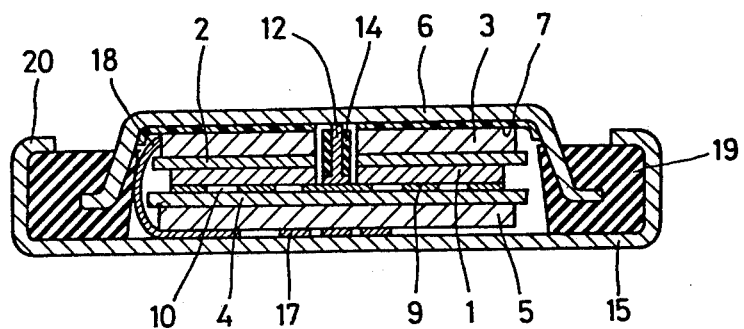
FIG. 7 is a sectional view of a fourth embodiment of a battery in accordance with the present invention.
Figure 8:
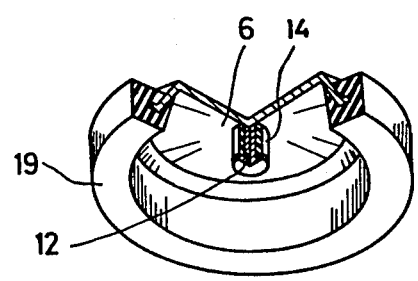
FIG. 8 is a perspective view, with portions broken away, of a portion of the battery in FIG. 7 taken from beneath.

The operational effect of a battery of the fifth embodiment is substantially equal to that of the fourth embodiment in FIG. 7.

What we claim is:

1. A battery comprising:
a first electrode plate having a first polarity;
a second electrode plate located on one side of the first electrode plate and having a second polarity;
a first separated layer disposed between said first and second electrode plates;
a third electrode plate on another side of the first electrode plate and having said second polarity;
a second separator layer disposed between the first and third electrode plates;
a first outer case forming a battery terminal of the first polarity;
a collector element electrically connecting the first electrode plate and the first outer case together;
a first insulating layer disposed immediately adjacent the first outer case, the second electrode plate and the collector element in a manner that an internal battery connection to the first outer case through the collector element is permitted while all other internal battery connections to the first outer case are prevented; and
a second outer case forming a battery terminal of the second polarity, the second outer case being electrically connected to the second and third electrode plate and being electrically insulated from the first outer case.

2. The battery defined by claim 1, wherein the first outer case is located adjacent the second electrode plate, wherein the second outer case is opposed to the first outer case and is located adjacent the third electrode plate, and wherein the collector element is a collector rod extending through aligned bores in the first separator layer, the second electrode plate, and the insulating layer.

3. The battery defined by claim 2, further including an insulating cylinder surrounding an outer periphery of the collector rod and insulating it from the second electrode plate.

4. The battery defined by claim 1, wherein the first electrode plate contains metallic lithium as an active material and wherein the second and third electrode plates contain manganese dioxide as an active material.

5. The battery defined by claim 2, further including a collector plate which is pressed against the first electrode plate and is attached to an end of the collector rod.

6. The battery defined by claim 5, wherein the first electrode plate has a central bore through which the collector rod extends and the collector plate has another central bore within which said end of the collector rod is received.

7. The battery defined by claim 5, wherein the collector plate is pressed against an upper surface of the first electrode plate.

8. The battery defined by claim 3, wherein the insulating cylinder is integral with the first insulating layer to form a unitary element.

9. The battery defined by claim 2, further including a second collector plate located between the second outer case and the third electrode plate, the second collector plate having a resilient spring piece which presses against the third electrode plate and urges the third electrode plate upwardly.

10. The battery defined by claim 9, wherein the resilient spring piece is a partially cut away portion of the second collector plate and is raised upwardly therefrom.

11. The battery defined by claim 2, wherein an end of the collector rod abuts the first outer case.

12. The battery defined by claim 11, wherein said end is attached to the first outer case.

13. The battery defined by claim 12, wherein the first insulating plate, the second electrode plate and the first separator layer are successively inserted over the collector rod.

14. The battery defined by claim 13, further including a collector plate which is electrically connected to the first electrode plate and which is spot-welded to another end of the collector rod.

15. The battery defined by claim 9, wherein the second collector plate is spot-welded to the second outer case.

16. The battery defined by claim 10, wherein the second collector plate is spot-welded to the second outer case.

* * * * *